United States Patent

Flahie et al.

[11] Patent Number: 5,912,832
[45] Date of Patent: Jun. 15, 1999

[54] FAST N-BIT BY N-BIT MULTIPLIERS USING 4-BIT BY 4-BIT MULTIPLIERS AND CASCADED ADDERS

[75] Inventors: Michael F. Flahie, Schertz; Buck W. Gremel, El Paso, both of Tex.

[73] Assignee: Board of Regents, The University of Texas System, Austin, Tex.

[21] Appl. No.: 08/713,822

[22] Filed: Sep. 12, 1996

[51] Int. Cl.[6] .................................................. G06F 7/50
[52] U.S. Cl. .......................................................... 364/786.02
[58] Field of Search ...................... 364/786.02, 786.01, 364/786.03

[56] References Cited

U.S. PATENT DOCUMENTS

| | | | |
|---|---|---|---|
| 2,694,521 | 11/1954 | Newman et al. | 364/786.01 |
| 3,670,956 | 6/1972 | Calhoun | 235/164 |
| 3,752,971 | 8/1973 | Calhoun et al. | 235/164 |
| 3,795,880 | 3/1974 | Singh et al. | 235/164 |
| 4,172,288 | 10/1979 | Anderson | 364/771 |
| 4,293,922 | 10/1981 | Davio et al. | 364/757 |
| 4,594,679 | 6/1986 | George et al. | 364/754 |
| 5,036,483 | 7/1991 | Virtue | 364/786.02 |
| 5,060,183 | 10/1991 | Sakashita et al. | 364/757 |
| 5,159,568 | 10/1992 | Adiletta et al. | 364/758 |
| 5,343,417 | 8/1994 | Flora | 364/758 |

FOREIGN PATENT DOCUMENTS 2902488  7/1980  Germany .

OTHER PUBLICATIONS

Buhss,"Multiplikationshardwarefür Einchip–Mikrorechner U 882," *Radio Fernsehen Elektronik*, 37(6):393–394. 1988. (English translation attached) (Abstract only)

Dauby et al., "Two's complement Multiplier," *IBM Technical Disclosure Bulletin*, 18(5):1482–1483, 1975.

Obaidat et al., "Fast Mult–step Addition Algorithm," *International Journal of Electronics*, 70(5):839–849, 1991.

Yung et al., "Part 2: An optimising analysis of hierarchial multipliers for VLSI," *IEE Proceedings G. Electronic Circuits & Systems*, 131(2):61–66, 1984.

Yung et al., "Recursive addition and its parametisation in VLSI," *IEE Proceedings G. Electronic Circuits & Systems*, 133(5):256–264, 1986.

*Primary Examiner*—David H. Malzahn
*Attorney, Agent, or Firm*—Arnold, White & Durkee

[57] ABSTRACT

A method and apparatus for n-bit by n-bit multiplication is disclosed using paralleled 4-bit by 4-bit multipliers and cascaded adder structures. The cascaded adder structures may be used to produce non-pipelined, integer, n-bit by n-bit multipliers with higher throughput than systolic array multipliers of similar geometries.

10 Claims, 22 Drawing Sheets

| BITS | CHA DELAY | CHAM DELAY | RIPPLE DELAY | CHA GATES | CHAM GATES | RIPPLE GATES | SPEED RATIO CHA/CHAM | SPEED RATIO CHA/RIP | SPEED RATIO CHAM/RIP |
|---|---|---|---|---|---|---|---|---|---|
| 4 | 5 | 5 | 9 | 23 | 23 | 20 | 1.00 | 1.80 | 1.80 |
| 8 | 9 | 10 | 17 | 79 | 55 | 40 | 1.11 | 1.89 | 1.70 |
| 16 | 17 | 20 | 33 | 287 | 119 | 80 | 1.18 | 1.94 | 1.65 |
| 32 | 33 | 40 | 65 | 1,087 | 247 | 160 | 1.21 | 1.97 | 1.63 |
| 64 | 65 | 80 | 129 | 4,223 | 503 | 320 | 1.23 | 1.98 | 1.61 |
| 128 | 129 | 160 | 257 | 16,639 | 1,015 | 640 | 1.24 | 1.99 | 1.61 |

FIG. 19

| BITS | MULTIPLIER TYPE | NUMBER OF GATES | CRITICAL PATH PROPAGATION DELAY | GATE RATIO | SPEED RATIO |
|---|---|---|---|---|---|
| 4X4 | CHA | 66 | 13 | 0.69 | 1.69 |
| | SYSTOLIC | 96 | 22 | | |
| 8X8 | CHA | 461 | 32 | 1.20 | 1.44 |
| | SYSTOLIC | 384 | 46 | | |
| 16X16 | CHA | 2,017 | 57 | 1.31 | 1.65 |
| | SYSTOLIC | 1,536 | 94 | | |
| 32X32 | CHA | 8,312 | 102 | 1.35 | 1.86 |
| | SYSTOLIC | 6,144 | 190 | | |
| 64X64 | CHA | 33,513 | 195 | 1.36 | 1.96 |
| | SYSTOLIC | 24,576 | 382 | | |

FIG. 20

| BITS | CHAM DELAY WORST CASE (ns) | CHAM DELAY BEST CASE (ns) | RIPPLE DELAY WORST CASE (ns) | RIPPLE DELAY BEST CASE (ns) | SPEED RATIO CHAM/RIP (BEST CASE) |
|---|---|---|---|---|---|
| 4 | 4.90 | 2.30 | 5.65 | 2.78 | 1.21 |
| 8 | 7.77 | 3.71 | 10.29 | 5.14 | 1.39 |
| 16 | 13.72 | 6.83 | 19.57 | 9.86 | 1.44 |
| 32 | 25.64 | 13.07 | 38.13 | 19.30 | 1.48 |
| 64 | 49.47 | 25.55 | 75.25 | 38.18 | 1.49 |
| RMS FIT* | $1.81 + 0.74n$ | $0.59 + 0.39n$ | $1.01 + 1.16n$ | $0.42 + 0.59n$ | 1.51** |

* EXCLUDING 4-BIT CHA VALUES
** IN THE LIMIT AS $n \gg 64$

FIG. 21

| BITS | MULTIPLIER TYPE | PROPAGATION DELAY BEST CASE (ns) | PROPAGATION DELAY WORST CASE (ns) | SPEED RATIO BEST CASE |
|---|---|---|---|---|
| 4X4 | CHA | 4.75 | 9.79 | 1.68 |
| | SYSTOLIC | 7.98 | 16.47 | |
| 8X8 | CHA | 12.44 | 25.85 | 1.36 |
| | SYSTOLIC | 16.94 | 34.79 | |
| 16X16 | CHA | 21.34 | 43.42 | 1.63 |
| | SYSTOLIC | 34.86 | 71.43 | |
| 32X32 | CHA | 36.44 | 72.86 | 1.94 |
| | SYSTOLIC | 70.7 | 144.71 | |
| 64X64* | CHA | 68.38 | 135.32 | 2.08 |
| | SYSTOLIC | 142.38 | 291.27 | |
| RMS FIT | CHA** | $0.99196n + 4.89$ | $1.94n + 11.16$ | 2.26*** |
| | SYSTOLIC | $2.24n - 0.98$ | $4.58n - 1.85$ | |

\* 64X64 BIT DATA EXTRAPOLATED FROM RMS FIT
\*\* CHA RMS FIT DOES NOT INCLUDE 4-BIT BY 4-BIT MULTIPLIER
\*\*\* IN THE LIMIT AS $n >> 64$

FAST N-BIT BY N-BIT MULTIPLIERS USING 4-BIT BY 4-BIT MULTIPLIERS AND CASCADED ADDERS

This invention was made with Government support by the Office of Naval Research under Grant No. N00014-93-1-1343. The Government may have certain rights in this invention

FIELD OF INVENTION

The present invention relates to a method and apparatus for performing arithmetic operations and, more specifically, to digital adder and multiplier circuits.

BACKGROUND OF THE INVENTION

Along with the development of higher speed processors, an equal demand for higher speed parallel multipliers has evolved in order to enhance image signal and digital signal processing. As sub-micron geometry technologies have matured and material processes have been refined, practical high-speed multiplier structures using a variety of algorithmic approaches have been realized and implemented in VLSI circuits. Higher speed multipliers are advantageous particularly in Modularly Configured Attached Processors (MCAPs) using Multichip Modules (MCMs).

Optimality for n-bit by n-bit integer multiplication is defined by the $AT^2$ measure of complexity, where A is the area of the multiplier chip, and T is the computation time, or the total propagation delay between the input n-bit multiplicand and n-bit multiplier, and the 2n-bit product output. Any multiplier of two n-bit integers must satisfy $AT^2=O(n^2)$, and $A=O(n)$. Fan-in constraints of VLSI logic gates result in optimal lower boundary times of $T=O(\log_2 n)$, which in turn place the lower limit for T in the range of $\log_2 n$ to $n^{1/2}$, for which an $AT^2$-optimal multiplier may exist.

$AT^2$-optimality ranges of $O(n^2(\log_2 n)^3)$, and propagation delay times in the range $T=O((\log_2 n)^2)$ to $T=O(n^{1/2})$ have been realized using Discrete Fourier Transforms (DFTs) for computing convolutions. None of these designs, however, attain an optimal $T=O(\log_2 n)$. The Wallace tree and Dadda counting algorithms achieve optimal computation time, but are impractical for VLSI design. Divide and conquer techniques combined with redundant operand representations have achieved optimal computation times with an $AT^2=O(n^2(\log_2 n)^2)$. It is therefore an object of the present invention to design a multiplier circuit having optimal computation time and amenability for VLSI design.

SUMMARY OF THE INVENTION

The present invention includes a method and apparatus for arithmetic operations. The algorithms employed in the digital circuits permit fast multiplication of two n-bit x n-bit numbers. The apparatus may include a digital circuit for adding two n-bit numbers to develop a final sum, comprising four levels of adder circuits having a plurality of half adder circuits arranged in order from a least significant level half adder circuit to a most significant level half adder circuit. A plurality of logic gates may be connected to receive a plurality of carry outputs from selected ones of half adder circuits of the various outputs, and selected sum outputs of the first, second, third and fourth level half adder circuits together form a final sum having n+1 bits.

The present invention also includes an adder circuit for summing two n-bit by n-bit numbers to develop a final sum, comprising a plurality of half adder circuits receiving inputs from a first n/2-bit adder circuit and a second n/2-bit adder circuit, wherein carry outputs of less significant half adder circuits may be connected to next higher significant half adder circuits, a carry output of the most significant half adder circuit may be connected to a first input of a logic gate; and the logic gate may receive a second input from the second n/2-bit adder circuit.

The present invention also includes an improved fast multiplication circuit for forming the product of two n-bit numbers, comprising a plurality of partial product multiplier circuits capable of producing 8-bit partial products, each of which receives a different combination of 4-bit inputs from the two n-bit numbers; and an array of adder circuits for combining the 8-bit partial products comprising a first level adder circuit for creating a plurality of first partial product sums, which may be input into a second level adder circuit for creating a plurality of second partial product sums, which may be input into a third level adder circuit for creating a final 2n-bit product.

The present invention also includes a method of forming a product from an n-bit multiplicand and an n-bit multiplier using a digital circuit, comprising the steps of segregating the numbers into 4-bit blocks; multiplying a plurality of unique combinations of the 4-bit blocks, to produce a plurality of partial products; segregating each of the partial products into upper and lower nibble, thereby obtaining a plurality of upper and lower nibbles; summing the lower nibbles to obtain a lower partial product sum; summing the upper nibbles to obtain an upper partial product sum; and combining the upper and lower partial product sums to obtain the product.

BRIEF DESCRIPTION OF DRAWINGS

FIG. 19 is a tabular representation of gate counts and theoretical delays for CHA/CHAM/ripples adders.

FIG. 20 is a tabular representation of gate counts and theoretical delays for CHA and systolic array multipliers.

FIG. 21 is a tabular representation of simulation results for CHAM and ripple adders.

FIG. 22 is a tabular representation of simulation results for CHA and systolic array multipliers.

DETAILED DESCRIPTION OF EXEMPLARY EMBODIMENTS

In the present invention, polynomial multiplication and combinatorial addition may be used to attain a multiplier that may be twice as fast as current systolic array multipliers. Further, the structure is highly amenable to VLSI fabrication, and may easily be scaled to higher order multiplications.

An n-bit by n-bit binary multiplication produces n rows of n bits each, with each row shifted 1 bit left from its predecessor. There are $n^2$ one-bit multiplication steps that require one AND gate delay when done in parallel, and $2n^2 - 3n$ addition steps. If each sum takes one gate delay, then for a 16-bit by 16-bit multiplication, for example, there are a total of 464 gate delays for the additions, and 1 gate delay for the multiplications, assuming a parallel input. If shift registers are used to perform the additions, additional overhead may be incurred in the add, store, shift, and fetch cycles.

The product of two n-bit integers may be obtained in parallel using the grade school multiplication rule and associative fan-in using $O(n^2)$ gates in $O((\log_2 n)^2)$ steps. The solution to obtaining minimal gate delay rests in achieving near total parallelization of the addition processes via associative fan-in where the $n^2$ partial products are first computed in one step, and then fed to suitable parallel adders for final recombination.

Figure 1:
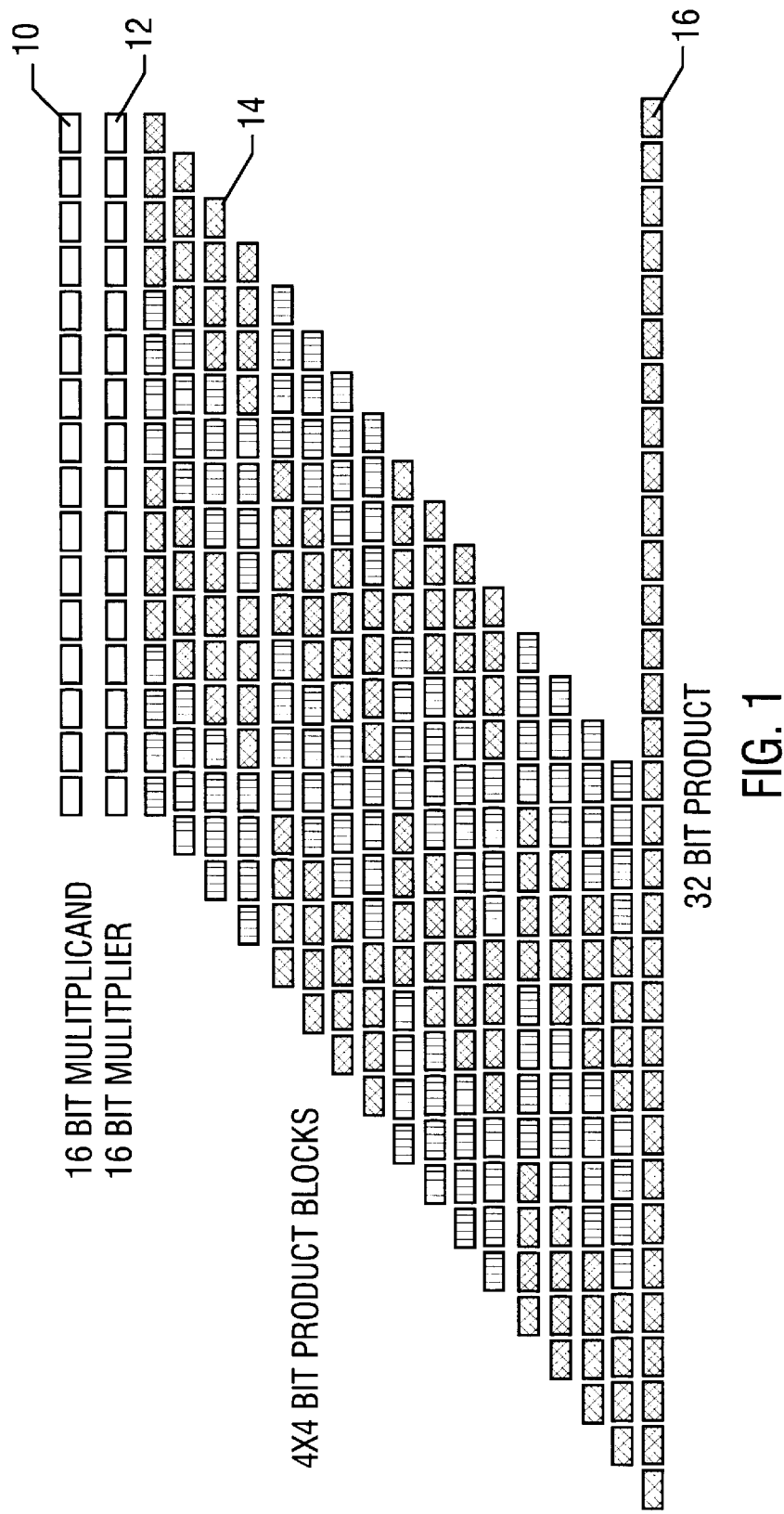
FIG. 1 is a block diagram of a 16-bit by 16-bit multiplication.

The present invention comprises an algorithm for multiplication of an n-bit by n-bit number. The multiplicand and multiplier of an n-bit by n-bit multiplication may be segregated into, for example, 4-bit blocks. The multiplication may be accomplished by performing n 4-bit by 4-bit multiplications in parallel, then recombining these n 8-bit products in a suitable manner using multiples of 4-bit adders. In an exemplary embodiment, the 8-bit multiplication products may be generated by fast 4-bit by 4-bit multipliers. FIG. I shows a block diagram describing a 16-bit by 16-bit multiplication. A multiplicand 10 is to be multiplied by a multiplier 12. Blocks 14 represent groupings of 4-bit by 4-bit product blocks. These blocks 14 may be expanded into sixteen 8-bit partial product sums (not shown in FIG. 1). These sixteen 8-bit products may be summed appropriately to produce the final 32-bit product 16.

Figure 2:
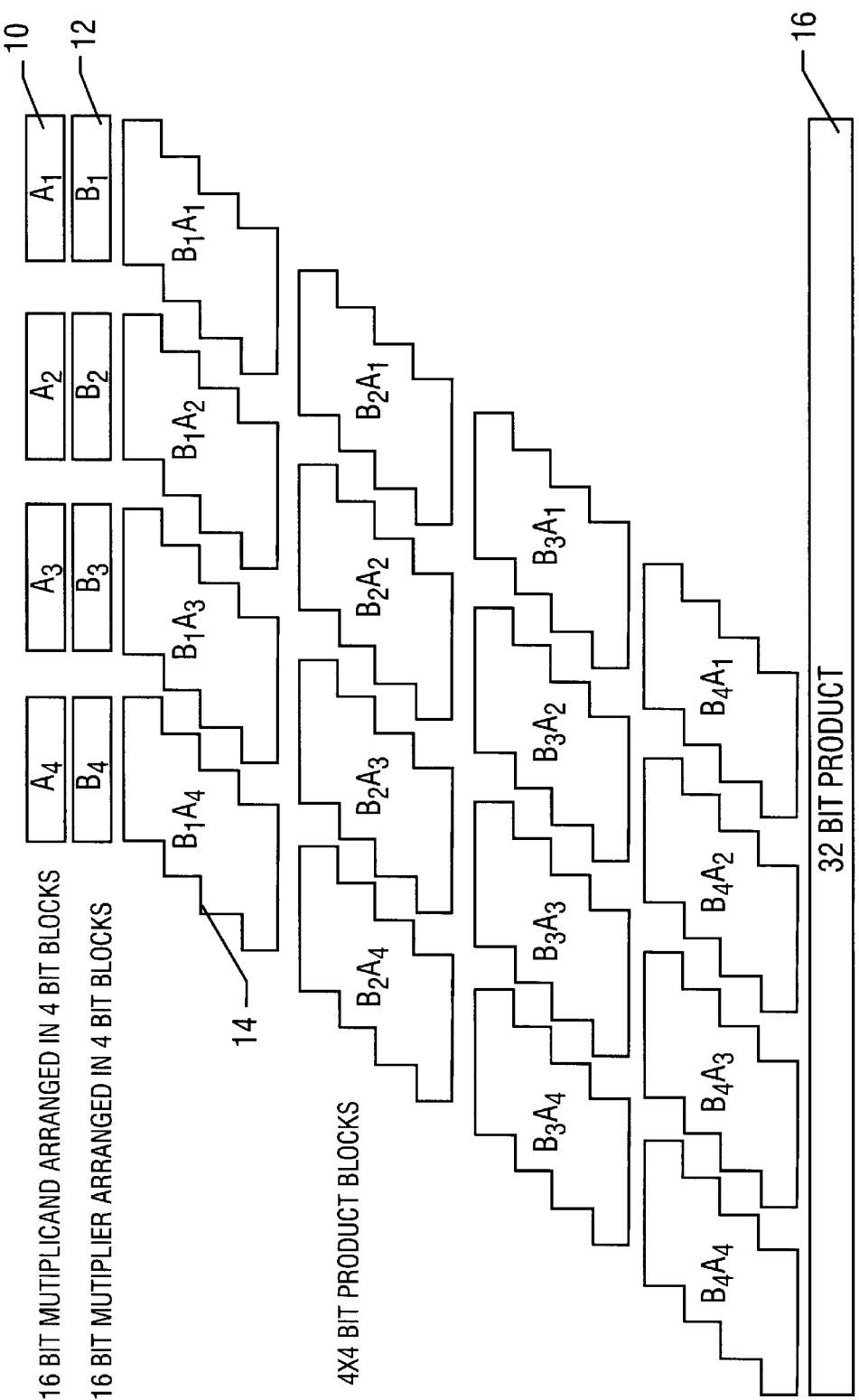
FIG. 2 is a block diagram of 16-bit by 16-bit partial products arranged in 4-bit by 4-bit product blocks.

FIG. 2 shows the segregation of multiplier 12 and multiplicand 10 into 4-bit blocks. $A_1$ through $A_4$ represent 4-bit blocks of the 16 bits of multiplicand 10, and $B_1$ through $B_4$ represent 4-bit blocks of the 16 bits of multiplier 12. The sixteen partial product blocks 14 are labeled corresponding to the major 4-bit blocks they represent (i.e., $B_1 A1$, $B_1 A_2$). Therefore, each one of the 4-bit blocks receives a unique combination of four bits of the multiplier 12 and four bits of the multiplicand 10.

Figure 3:
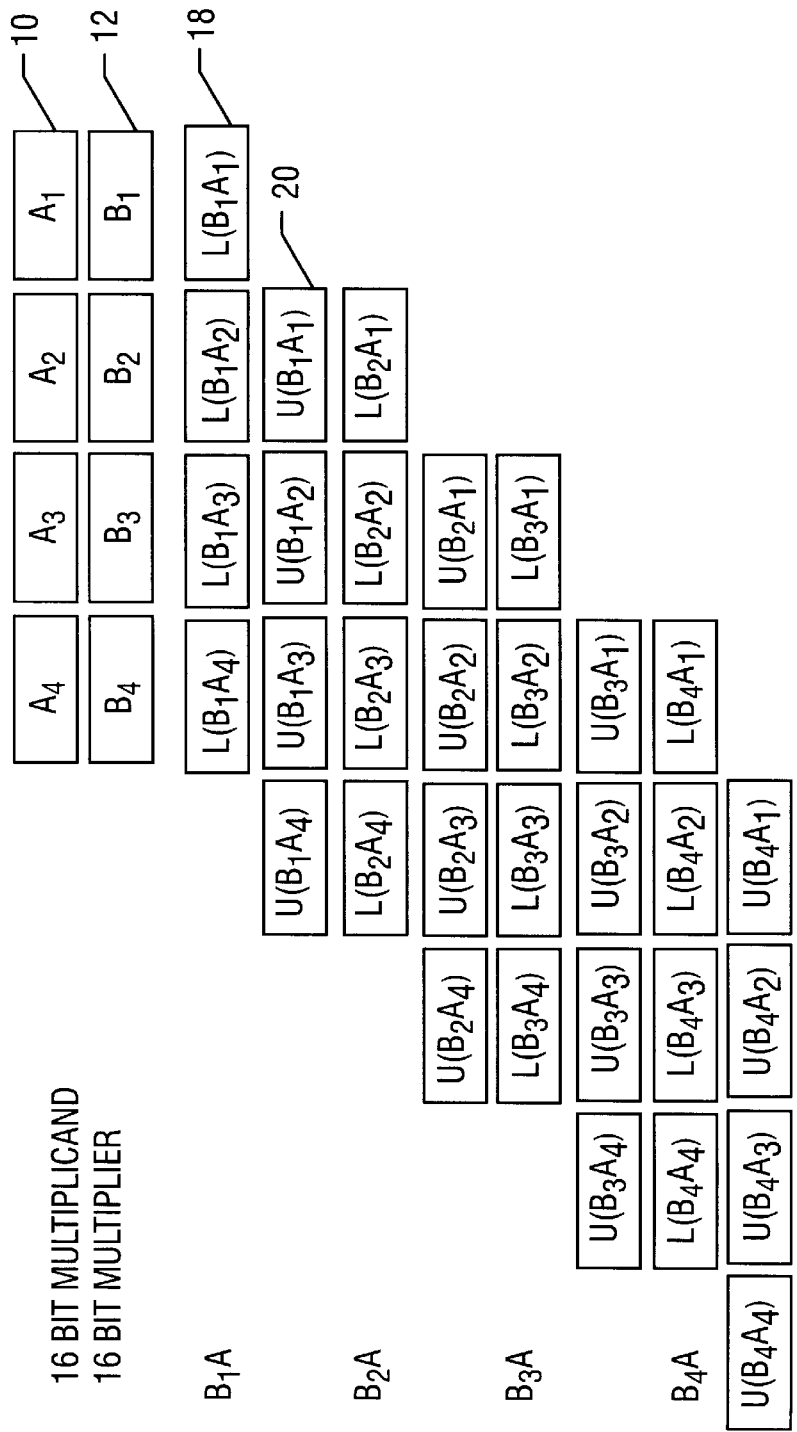
FIG. 3 is a block diagram of 8-bit products arranged in upper and lower nibbles.

The sixteen 8-bit partial products (not shown in FIG. 2) from each 4-bit by 4-bit block 14 may be expanded and grouped into upper and lower nibbles. Such a grouping is shown in FIG. 3. Lower nibbles 18 and upper nibbles 20 correspond to the least significant 4 bits (LSB) and most significant 4 bits (MSB), respectively, of the blocks 14. These groupings indicate that a means of parallelization of the multiplication and addition processes may be accomplished.

Figure 4:
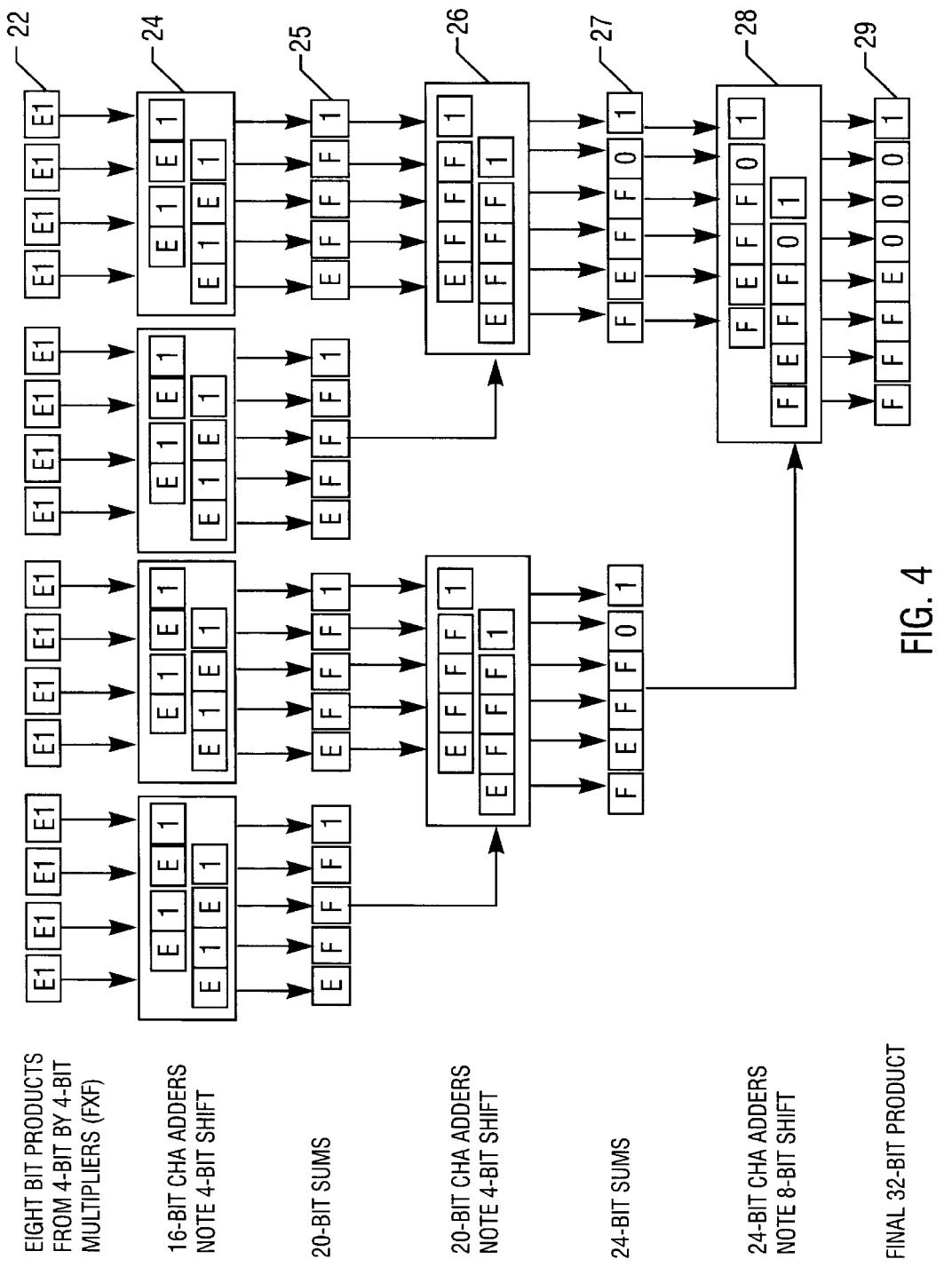
FIG. 4 is a block diagram of a 16-bit by 16-bit multiplication using 4-bit by 4-bit multipliers and CHA adders.

The 8-bit partial products 22 from each of these sixteen blocks 14 may be combined as shown in FIG. 4. The products 22 may be fed into a first level. The first level may be comprised of a plurality of adders 24. For example, the plurality of adders 24 may be 16-bit adders that develop 20-bit sums 25. The outputs 25 from the first level may then be fed to a second level. The second level may be comprised of a plurality of adders 26. For example, the plurality of adders 26 may be 20-bit adders that develop 24-bit sums 27. The outputs 27 from the second level may then be fed to a third level. The third level may be comprised of at least one adder 28. For example, adder 28 may be a 24-bit adder. Adder 28 therefore develops the final 32-bit product 29.

This algorithm, when combined with a fast 4-bit by 4-bit multiplier and fast adders, may achieve computation times superior to a standard 16-bit by 16-bit systolic array multiplier. Since the basic building block is 4-bits, the concept may be readily scaleable to higher order multipliers.

Additionally, the present invention provides fast adder structures so that optimal performance of the n-bit by n-bit multiplication may be achieved. However, it is not necessary to use the adder structures of the present invention in conjunction with the algorithm of the present invention. Additionally, it may be possible to use the fast adder structures of the present invention with many other types of digital circuitry.

An important consideration in the design of a fast multiplier is utilizing base unit adder structures that are as fast as possible, and consistent with existing technological constraints with respect to fabrication yield and VLSI rules of construction. In addition, it is desired that gate structures do not have fan-outs in excess of two units for power dissipation minimization and avoidance of high frequency performance degradation due to high RC charging times.

Selection of adders for the present invention may include, for example, carry look ahead adders, ripple adders, or other adders known in the art. Although carry look ahead (CLA) adders afford minimal delay times, they may present difficulties beyond the 4-bit level, because of fan-in constraints. Ripple adders, on the other hand, meet fan-in constraints but may have excessive delay times when VLSI-compliant architectures are used.

Figure 5:
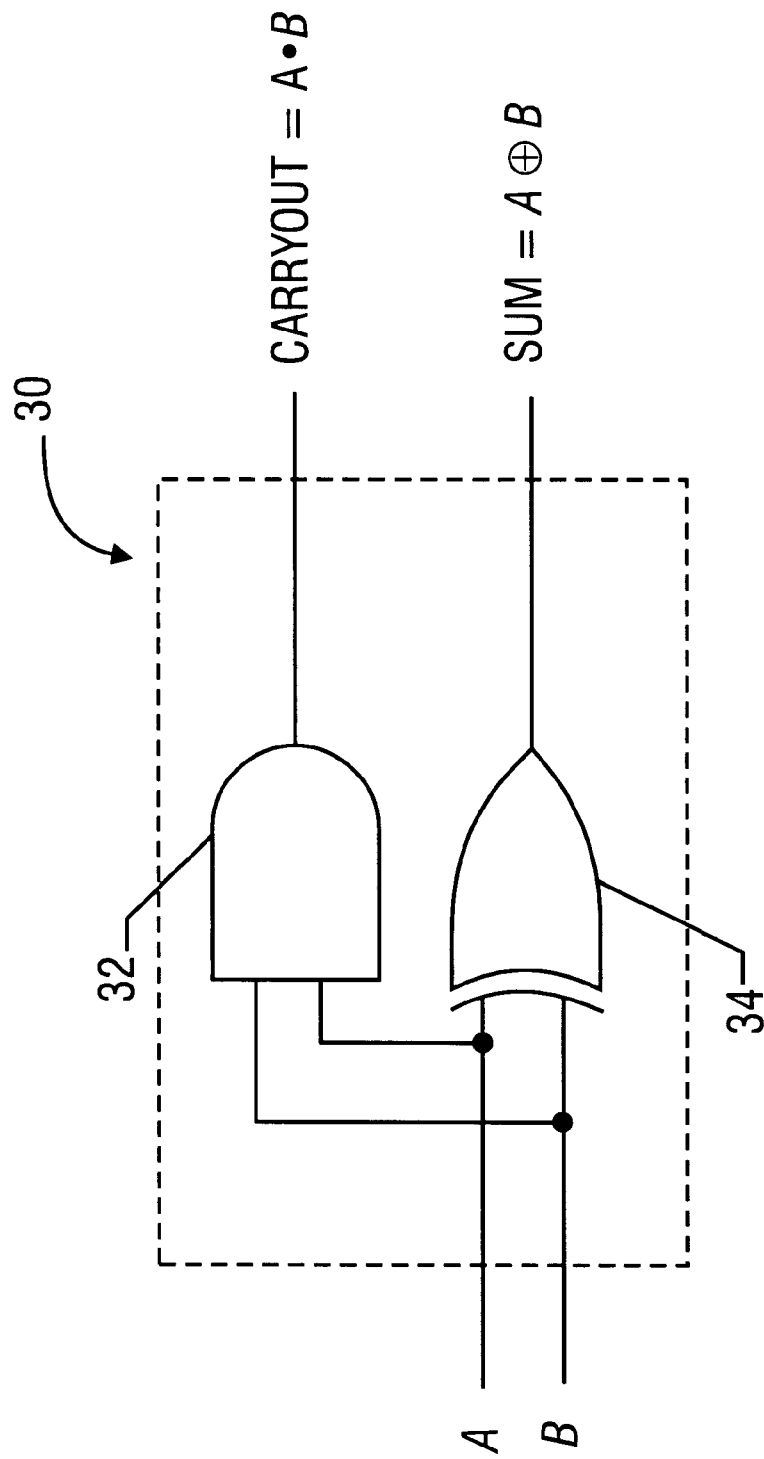
FIG. 5 is a logic diagram of a half adder basic cell.
Figure 6:
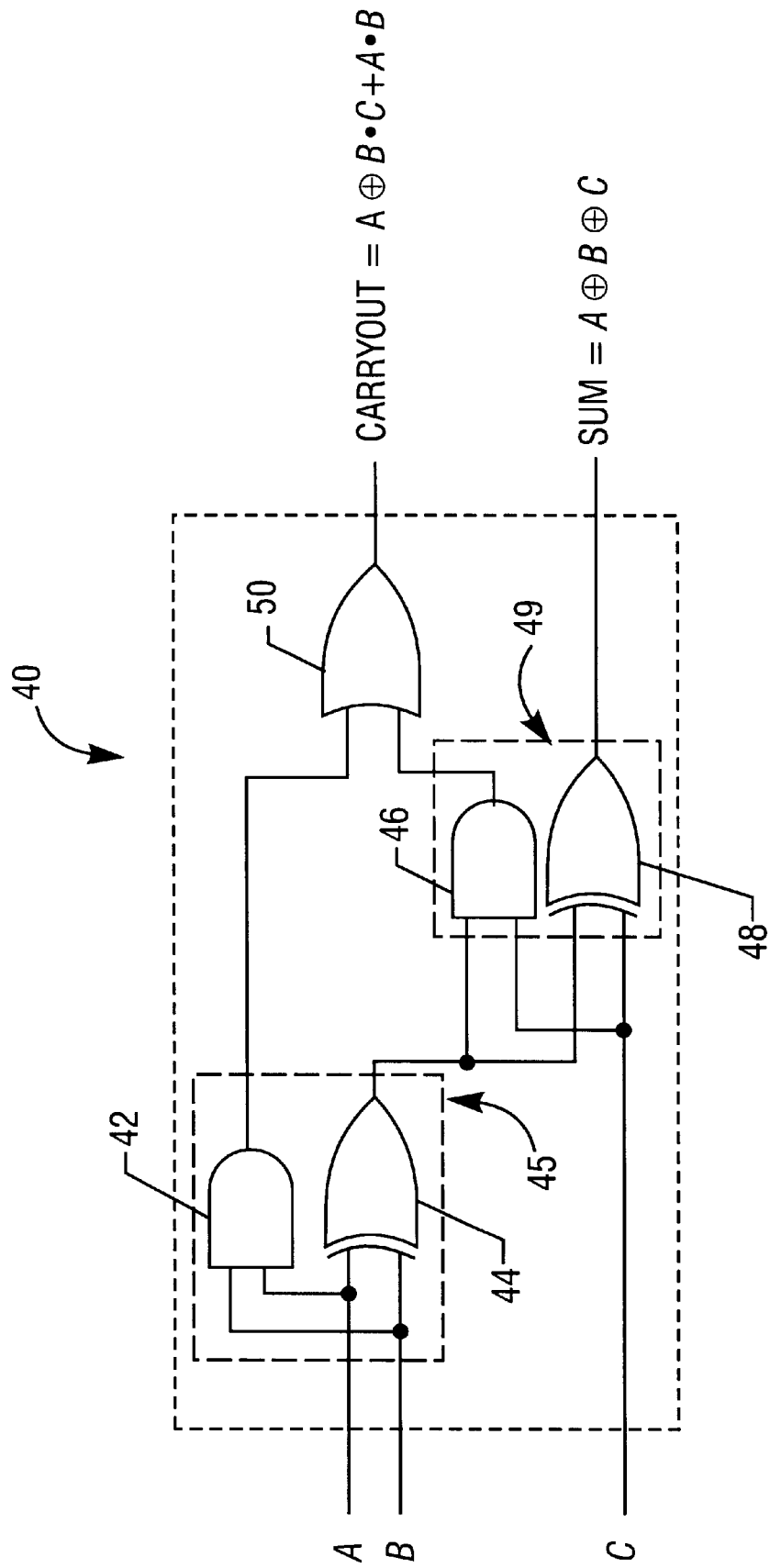
FIG. 6 is a logic diagram of a full adder cell.

FIG. 5 shows a basic structure used for a half adder (HA) 30. As shown in FIG. 5, a HA may be constructed by placing two inputs, A and B into each of one AND gate 32 and one EXCLUSIVE OR gate 34. The output of gate 34 is a sum bit, and the output of gate 32 is a carry bit. It is to be noted that other configurations of logic gates may be used to create a HA Using the same basic structure, a full adder (FA) 40 may be constructed by concatenation of two of these HAs. The FA 40 structure is shown in FIG. 6. Two inputs (A and B) may be input into both an AND gate 42 and an EXCLUSIVE OR gate 44, comprising HA 45. The sum output of this HA 45 may be input with another input (for example, input C) into a second HA 49 comprising AND gate 46 and EXCLUSIVE OR gate 48. The output of gate 48 is the sum bit of the 3-bit full adder 40. The outputs of gates 42 and 46 may be input into an OR gate 50. The output of this gate is the carry bit of the full adder 40. It is to be noted that other configurations of logic gates may be used to create a FA.

As shown in FIG. 6, the sum bit for the FA 40 has a critical path comprising two gate delays, and the carry out bit has a delay path of three. In general, the propagation delay for a ripple adder using the structure shown is given by $T_{delay}$= 2n+1 gate delays, and the total number of gates is given by $N_{gates}$=5n, where n is the highest order MSB bit to be added.

Figure 7:
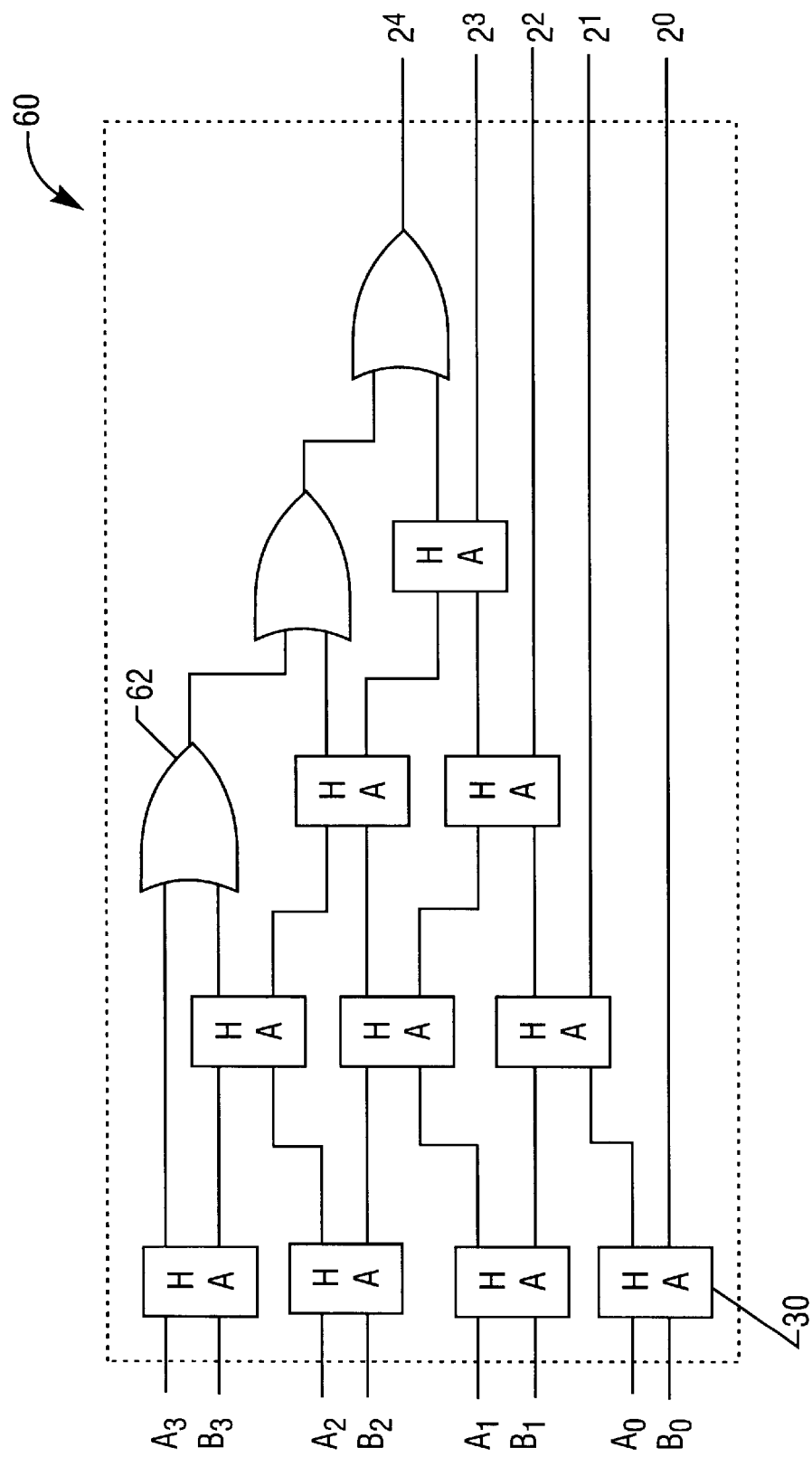
FIG. 7 is a block diagram of a cascaded half adder (CHA) 4-bit adder.

The present invention provides an apparatus that minimizes propagation delay in an n-bit adder. The design of such a circuit is shown in FIG. 7. This architecture may be referred to as a cascaded half adder (CHA) 60. The CHA 60 shown in FIG. 7 provides for 4-bit addition. As shown in FIG. 7, the CHA 60 may be comprised of a plurality of HAs 30 and associated OR gates 62 to develop a 5-bit sum. A first level of half adders 30 accepts inputs from two 4-bit words, $A_1$–$A_3$ and $B_1$–$B_3$. There may be four first level half adders 30, increasing from a least significant adder (accepting inputs $A_0$ and $B_0$) to a most significant adder (accepting inputs $A_3$ and $B_3$ ). A second level of half adders 30 accepts outputs from the first level. There may be three second level half adders 30, increasing from a least significant adder to a most significant adder. A third level of half adders 30 accepts outputs from the second level. There may be two third level half adders, increasing from a least significant adder to a most significant adder. A fourth level of half adders 30 accepts outputs from the third level. There may be at least one fourth level adder.

As shown in FIG. 7, the sum output of the least significant half adder of each level is a bit of the final 5-bit sum. For example, the sum output of the least significant first level half adder provides the $2^0$ position bit. It is to be noted that the most significant bit of the 5-bit sum is provided by a plurality of OR gates 62 which accepts as inputs the carry bit from the most significant half adder of each level. It is to be noted that larger or smaller CHAs may be created by increasing or decreasing the number of levels and number of half adders within each level.

The critical path propagation delay, $T_{delay}$, is 5 gates for this 4-bit CHA adder 60, or a factor of 1.8 times less than for a 4-bit ripple adder of similar construction. The number of gates for a 4-bit CHA adder 60 is 23, versus 20 for a 4-bit ripple adder. The CHA structure may easily be scaled to higher order adders. Unfortunately, the gate count may become excessive, although the propagation delay ratio between CHA and ripple adders approaches 2 at the higher order bit levels. For the CHA structure, the total number of gates is given by $N_{gates}$=$n^2$+2n−1, where n is the order of the MSB, and the $T_{delay}$=n+1 gate delays. This assumes that all gates are constrained to a fan-in and fan-out of 2 gates.

Figure 8:
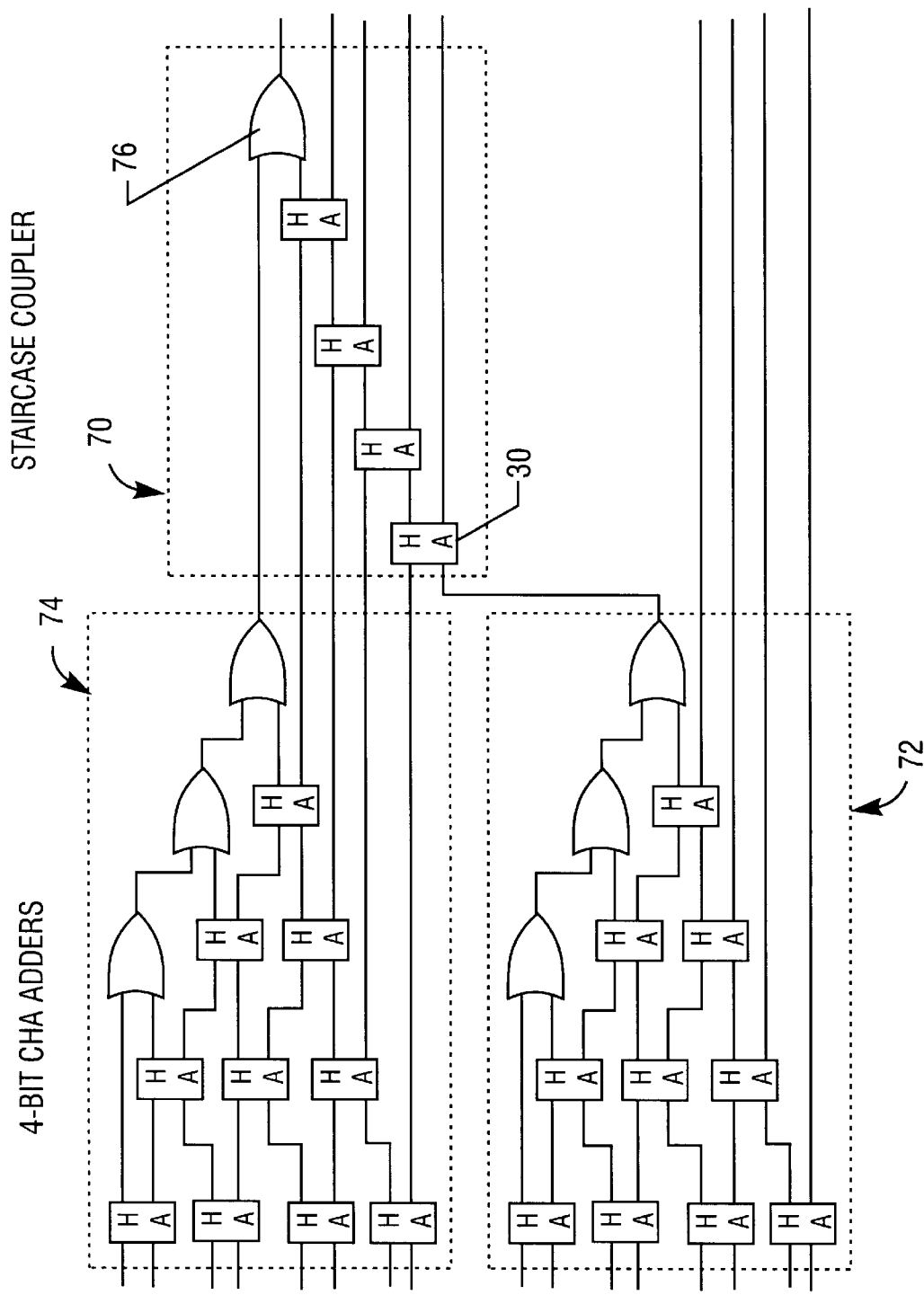
FIG. 8 is a block diagram of an 8-bit adder formed by two 4-bit CHA adders and one staircase coupler.

The present invention also provides architecture to minimize the excessive gate counts for CHA adders. This improvement may be obtained by using the basic 4-bit CHA adder 60 concatenated with additional circuitry that may be referred to as a CHA staircase coupler. This improved design is shown in FIG. 8. FIG. 8 shows a plurality of 4-bit CHA adders, the outputs of which are connected to a staircase coupler 70. Staircase coupler 70 may be comprised of a plurality of half adders 30 and an associated OR gate 76. As shown in FIG. 8, a first CHA adder 72 accepts inputs from the four least significant bits of each of two 8-bit words. A second CHA adder 74 accepts inputs from the four most significant bits of the two words. The four least significant bits of the final sum are output from the first CHA adder 72. The most significant bit of the final sum of first CHA adder 72 is input into a least significant half adder 30 of the staircase coupler 70. Outputs from the second CHA 72 are input into the various half adders 30 of staircase coupler 70. The most significant output from the second CHA adder 72 is input into OR gate 76 to provide the most significant bit of the final sum.

The improved design comprising a plurality of CHAs and at least one staircase coupler may be referred to as a modified CHA structure or CHAM. Using this CHAM, a significant reduction in gate counts may be achieved, while a slight increase in propagation delay is incurred. The propagation delay for an n-bit CHAM adder is $T_{delay}$=5n/4 (assuming equal gate delays), and the gate count is given by $N_{gates}$=8n−9. For example, an 8-bit CHA adder has $T_{delay}$=9 and $N_{gates}$=79; and an 8-bit CHAM adder has $T_{delay}$=10 and $N_{gates}$=55. Thus, a reduction of 24 gates, or 30%, may be achieved. Only a modest increase is incurred in propagation delay (this delay increase approaches approximately 25% for the higher order adders). The gate count reduction may be pronounced for higher order adders, e.g., a 64-bit CHA adder has 4,223 gates, with a propagation delay of 65 gates, whereas a 64-bit CHAM adder has 503 gates, with a propagation delay of 80 gates.

Figure 9:
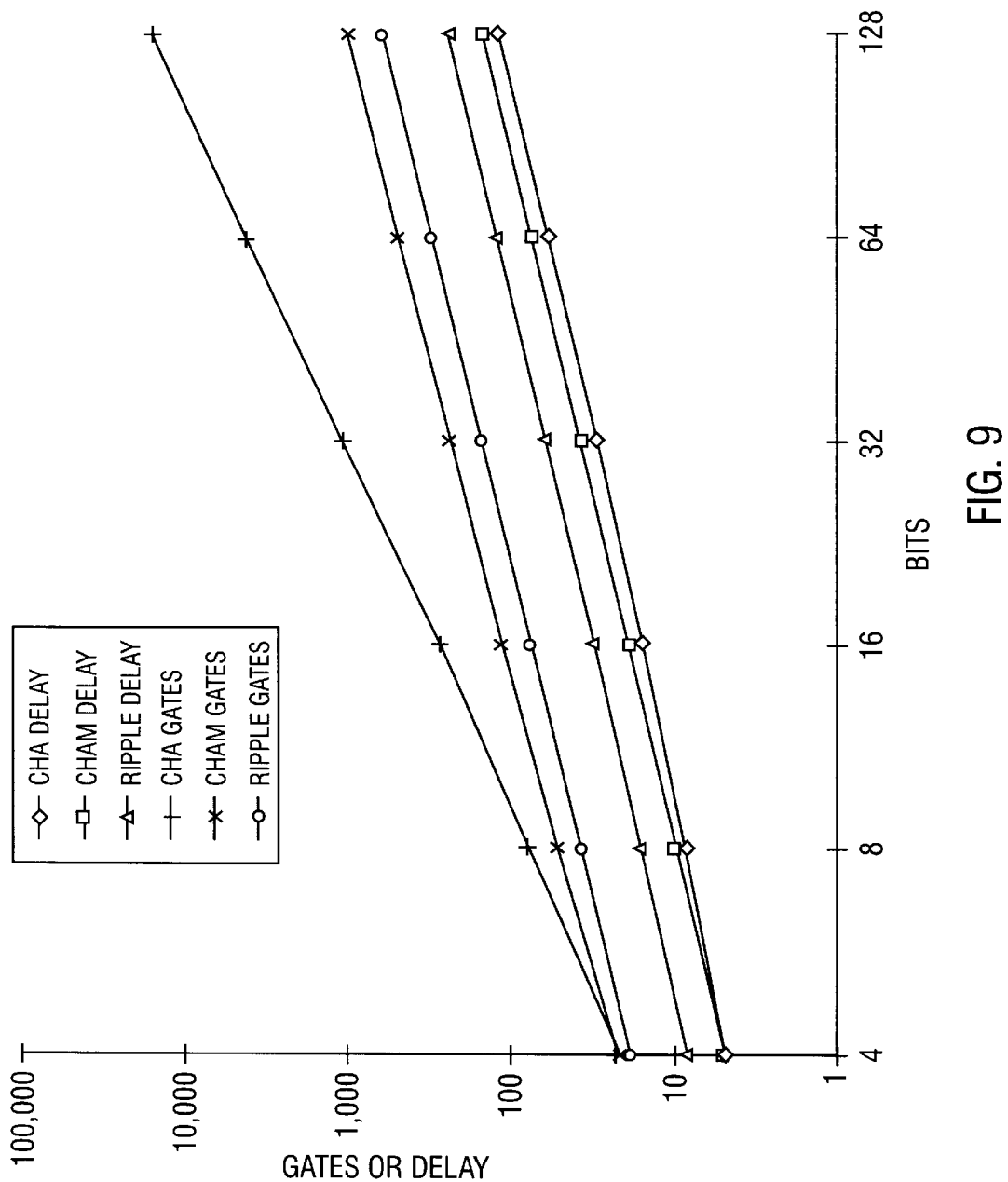
FIG. 9 is a graphical representation showing CHA/CHAM/ripple adder gate delays and gate counts.

Comparing CHAM adders to ripple adders, the inverse ratio of propagation delays, or speed ratio, is 4(2n+1)/5n, which approaches 1.6 for n>32. The gate count ratio, given by (8n−9)/5n, approaches 1.6 as well for n>>64. For a 64-bit adder, for example, the speed ratio is 1.61:1 in favor of the CHAM adder, and the gate count ratio is 1.59:1 in favor of the ripple adder. A theoretical 1.8–1.6:1 times factor in speed may be realized for a 1.15–1.6:1 factor in gate counts by using a CHA class adder rather than a ripple adder over the range of n of interest. FIG. 9 contrasts the propagation delays and gate counts between ripple, CHA, and modified CHA (CHAM) adders. This data is also shown in FIG. 19.

In order to form a basis of comparison with the n-bit by n-bit multipliers of the present invention, n-bit by n-bit systolic array multipliers will be discussed. A systolic, or iterative array is a collection of identical interconnected cells, each of which performs a single operation. Data flows synchronously between these cells, and the final output product is obtained at the boundaries. Since systolic arrays are combinatorial, the steady state output is obtained after the cumulative propagation delay along the longest critical path.

Figure 10:
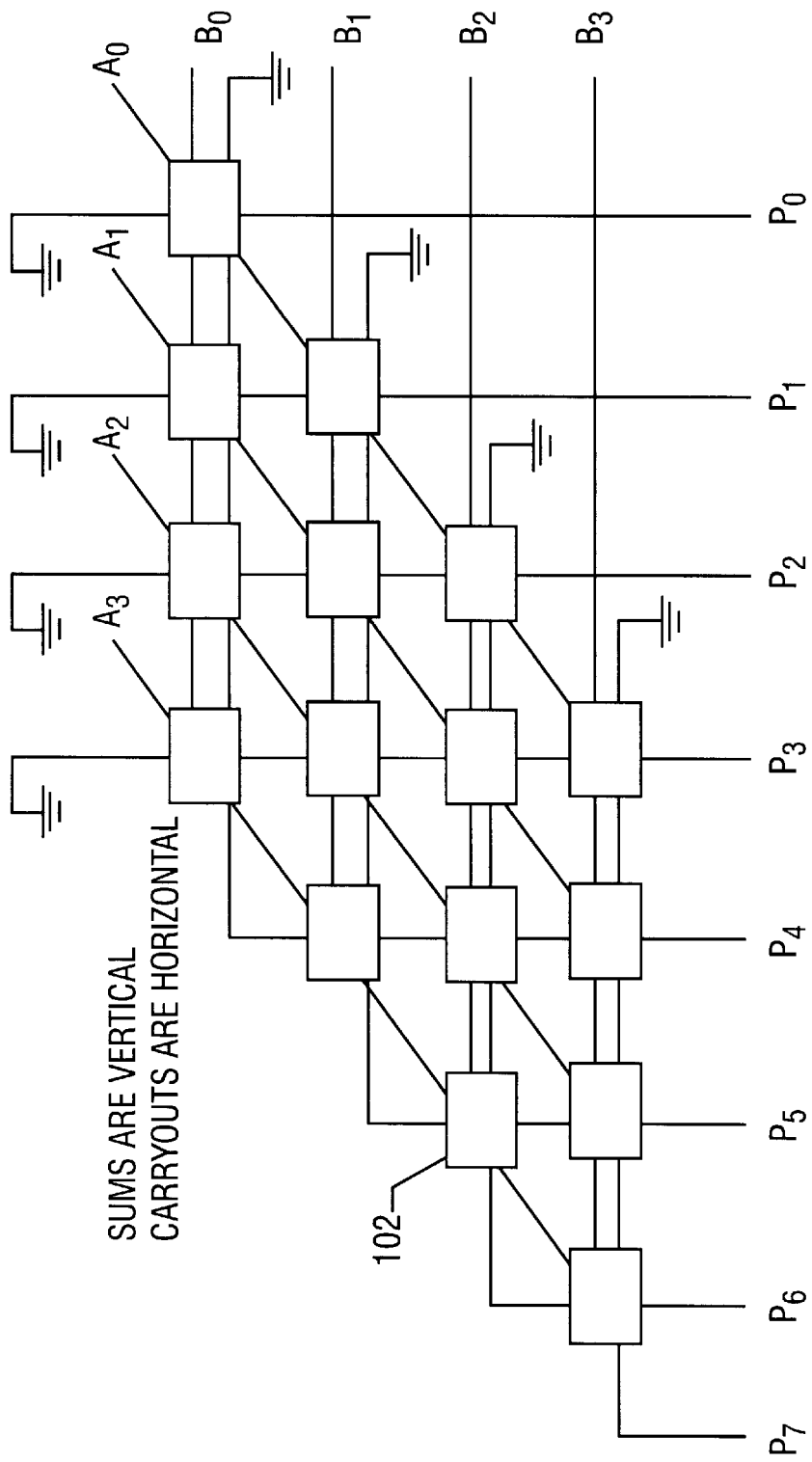
FIG. 10 is a block diagram of a 4-bit by 4-bit systolic array multiplier.
Figure 11:
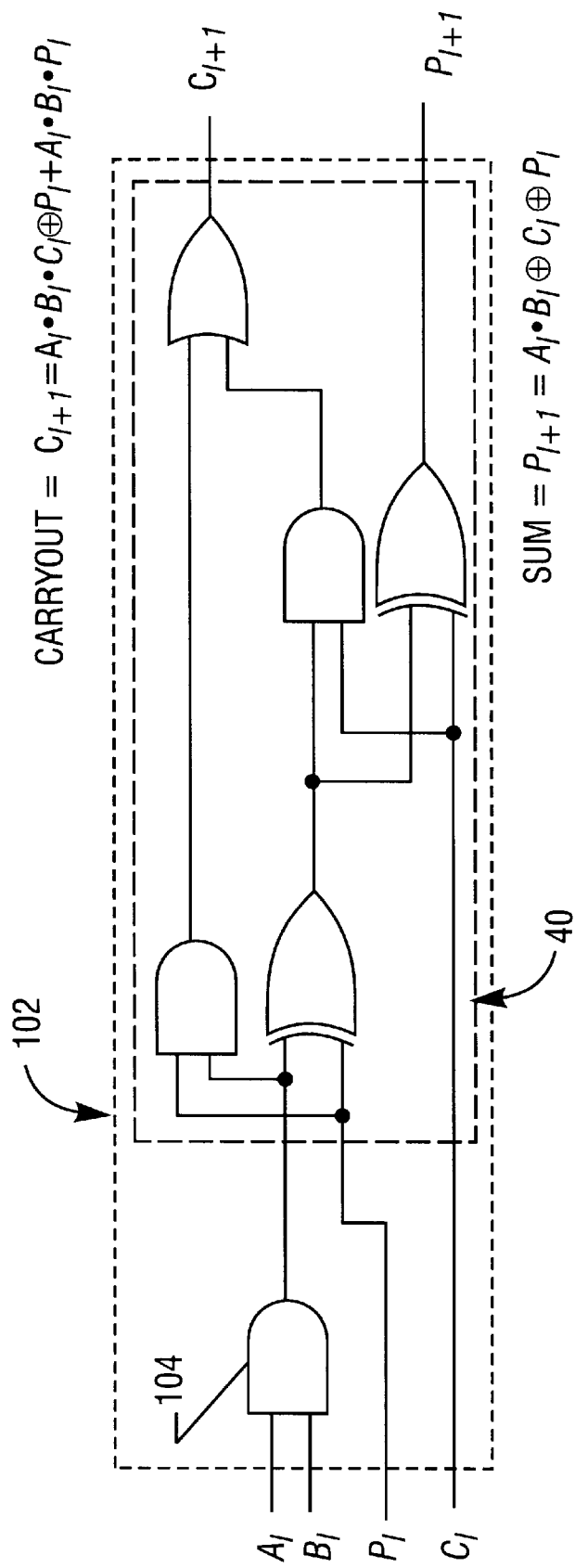
FIG. 11 is a logic diagram of a systolic array multiplier basic cell.
Figure 12:
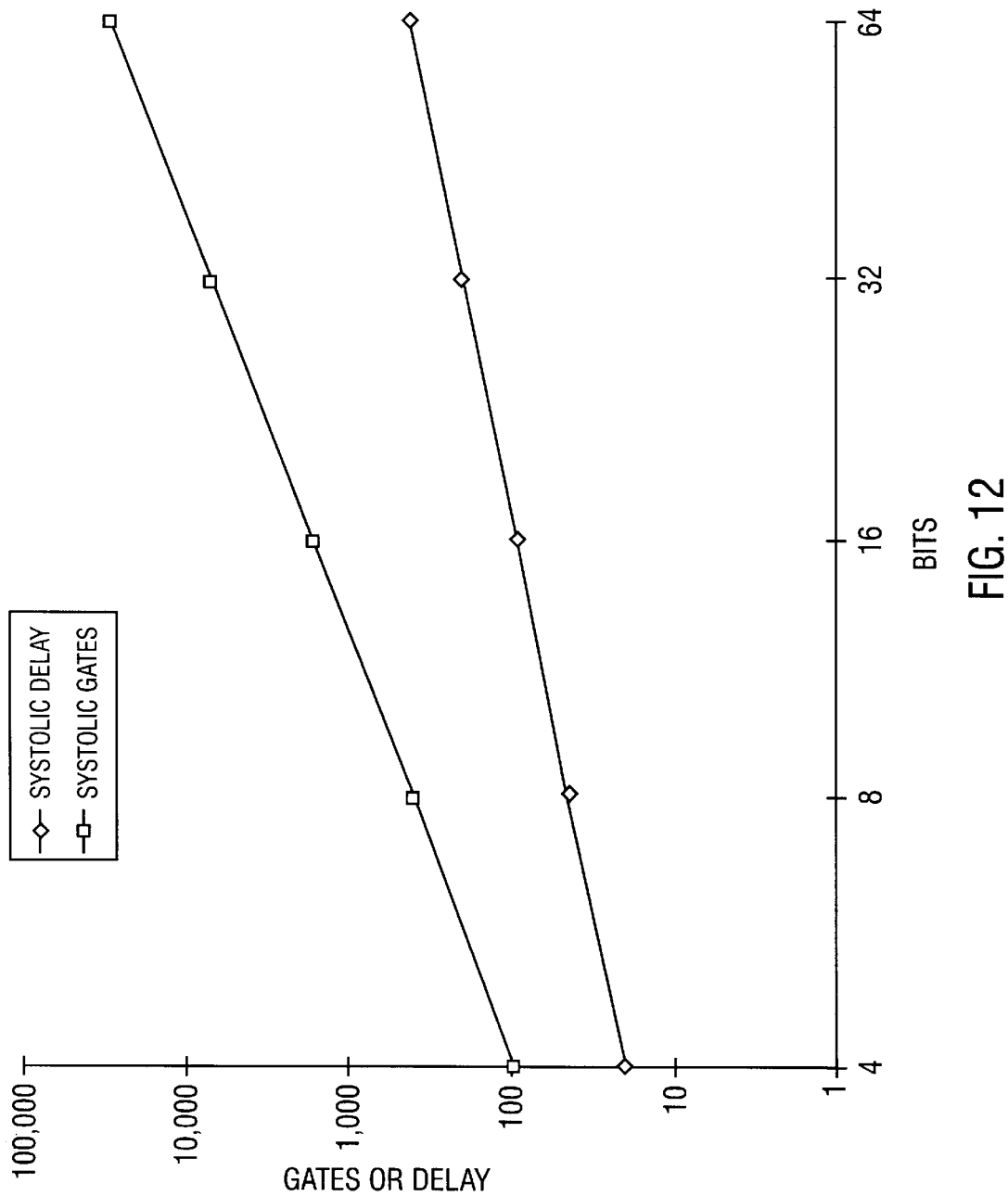
FIG. 12 is a graphical representation showing systolic array multiplier gate delays and gate counts.

Two-dimensional systolic arrays provide for realizable multiplier architectures in that replication of the basic cell for multipliers, a full adder, is a VLSI amenable process. FIG. 10 shows 4-bit by 4-bit systolic array multiplier. In FIG. 10, each cell 102 comprises a FA and an additional AND gate, with inputs to each cell being the multiplicand and multiplier bits, the partial product of the previous vertical neighbor, and the carryout bit from the previous horizontal cell. The output bits from each cell comprise the carryout bit, and the local partial product sum. Using the FA structure of FIG. 6, and adding a single AND gate, the systolic array basic cell is shown in FIG. 11. Inputs $A_1$ and $B_1$ are fed into AND gate 104. The output of gate 104 is fed into FA 40, along with $P_1$ and $C_1$. For the structure shown, each basic cell has a propagation delay of 3 gates for the sum bit, and a propagation delay of 4 gates for the carryout bit. For an n-bit by n-bit systolic array multiplier, the cumulative propagation delay along the critical path is given by $T_{delay}$= 3·(2n−1)+1 gate delays, where n is the order of the MSB. For the structure shown in FIG. 11, each unit cell has 6 gates, thus $N_{gates}$=$6n^2$. FIG. 12 shows the cumulative delay and the number of gates for systolic array multipliers using the basic cell given in FIG. 11 as a function of the number of bits. For example, a 64-bit by 64-bit systolic array multiplier has a cumulative propagation delay of 382 gates, and a gate count of 24,576.

Figure 13:
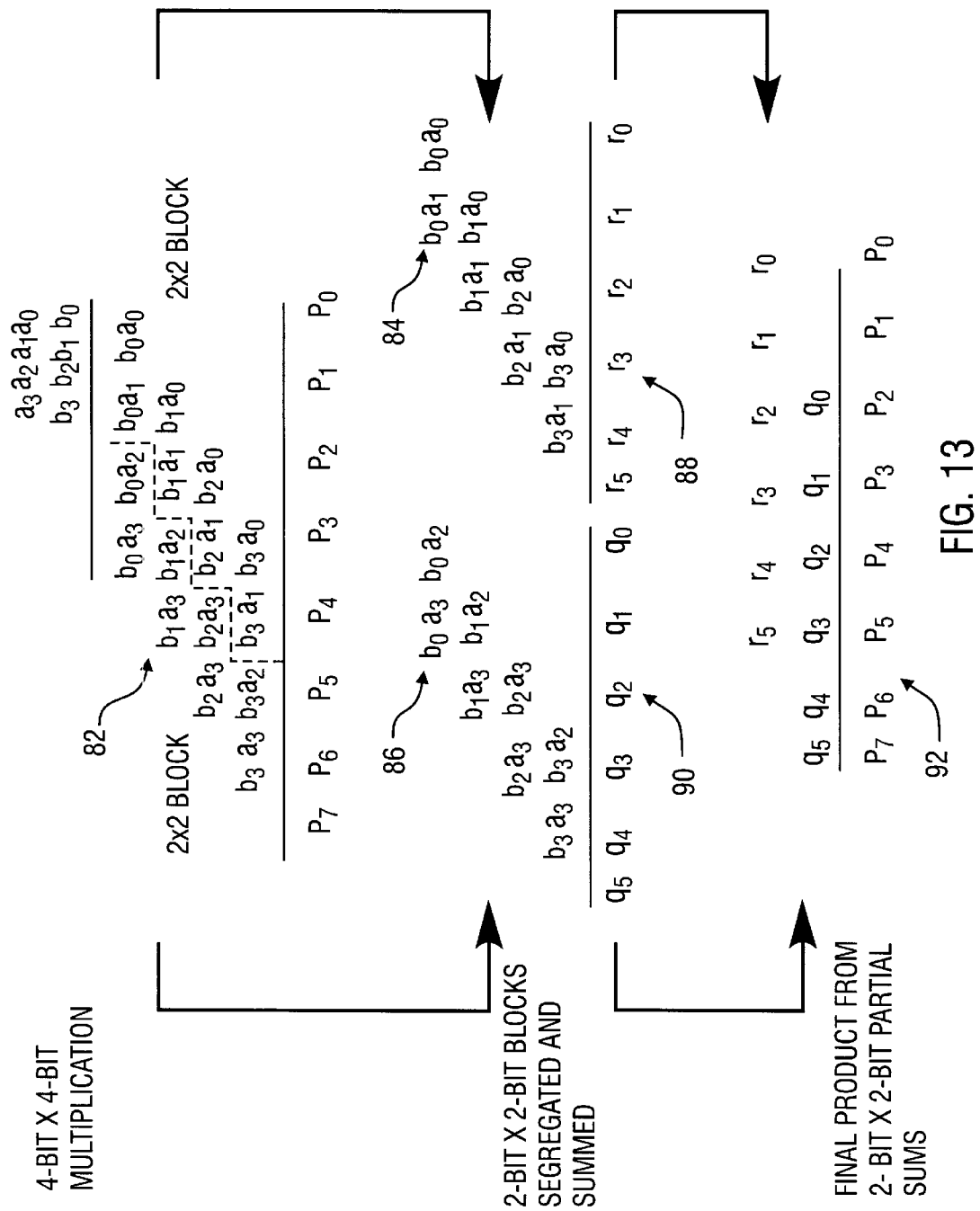
FIG. 13 is a block diagram of a multiplication algorithm for a 4-bit by 4-bit CHA multiplier.

In an exemplary embodiment, it may be desired to design a fast CHA 4-bit by 4-bit multiplier to be used as the front end to n-bit by n-bit multiplication. It is desired that a front end multiplier be faster than a comparable systolic array 4-bit by 4-bit multiplier, and be VLSI complaint. An algorithm according to the present invention is shown in FIG. 13. The algorithm segregates 4-bit by 4-bit multiplication into 2-bit by 2-bit blocks. As shown in FIG. 13, the partial product 82 is segregated into two 2-bit by 2-bit blocks 84 ($a_0$ and $a_1$) and 86 ($a_2$ and $a_3$). Each row of these blocks, blocks 84 and 86 may be called nibbles. These blocks 84 and 86 are then summed to develop partial sums 88 ($r_0$ through $r_5$) and 90 ($q_0$ through $q_5$). The final product 92 ($p_0$ through $p_7$) is developed by summing partial sums 88 and 90.

Figure 14:
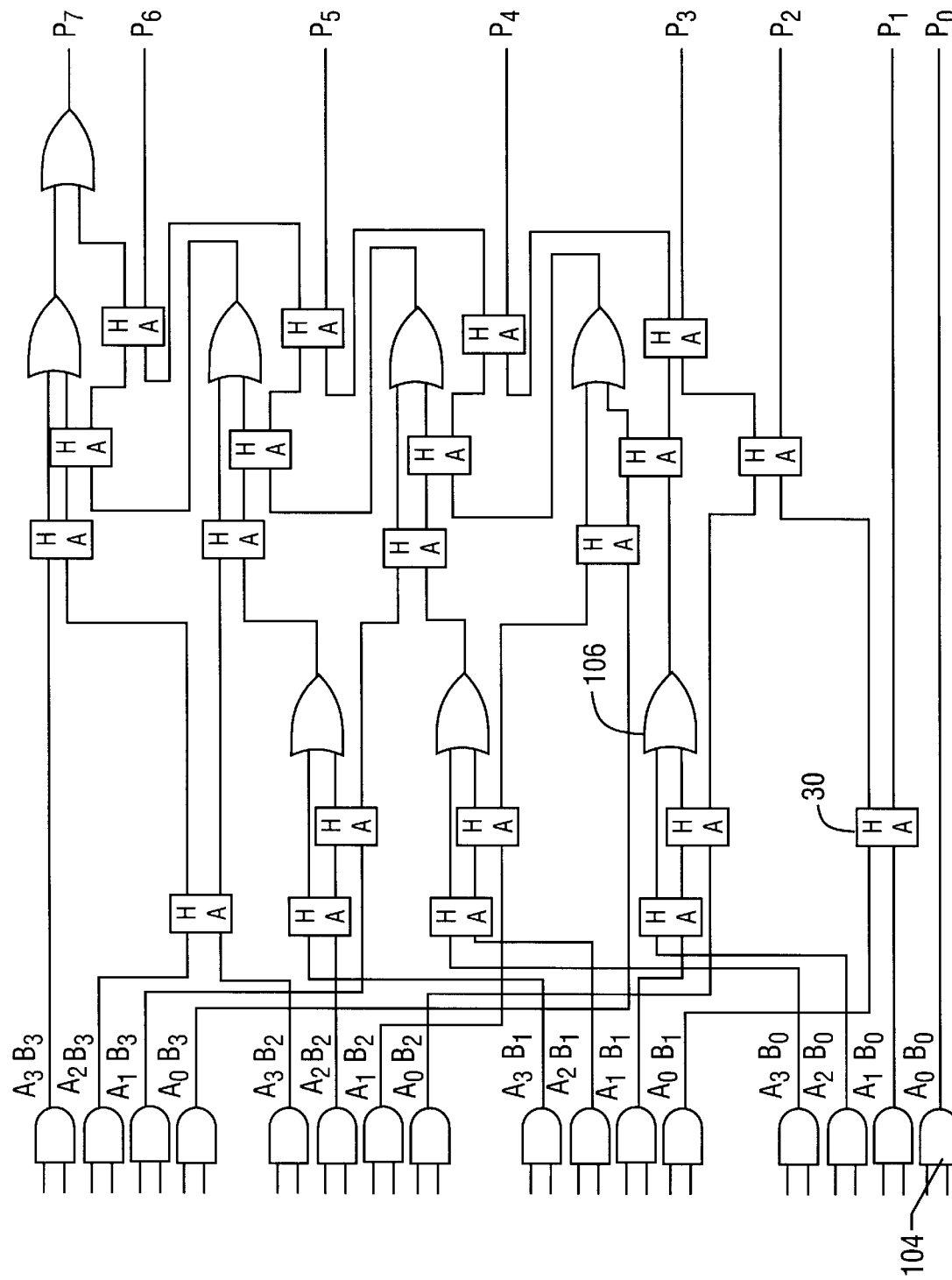
FIG. 14 is a block diagram of a 4-bit by 4-bit CHA multiplier.

Combining the algorithm with a CHA architecture, the resultant design for a 4-bit by 4-bit CHA multiplier is shown in FIG. 14. As shown in FIG. 14, the algorithm of FIG. 13 may be implemented with a design comprising a plurality of AND gates 104 as a front end to a plurality of half adders 30. The sum outputs of selected half adders 30 may comprise the individual bits of the final product $P_0$ through $P_7$. The carry bits of selected half adders 30 may be input into higher order half adders to develop higher order bits of the final product. Carry bits from higher order half adders may also be input into one of a plurality of OR gates 106. The outputs from certain of these gates 106 may be input into higher order half adders 30. The delay for this structure is $T_{delay}$=13, and the number of gates is $N_{gates}$=66. A 4-bit by 4-bit systolic array multiplier has $T_{delay}$=22, and $N_{gates}$= 96. Theoretically, the CHA multiplier is 1.69 times faster than the systolic array multiplier, and has 30 fewer gates.

An 8-bit by 8-bit multiplier may be designed according to the present invention. Such an 8-bit by 8-bit multiplier may require, for example, four 4-bit by 4-bit multipliers on the front end, two 8-bit CHAM adders, and one 12-bit CHAM adder to form the 16-bit product. A multiplier according to this design may have a cumulative $T_{delay}$=32, and $N_{gates}$= 461. An 8-bit by 8-bit systolic array multiplier has $T_{delay}$=46, and $N_{gates}$=384. The speed ratio of CHA to systolic is 1.44, and the gate count ratio is 1.2. Thus for a 20% increase in gate count a 44% increase in speed may be achieved. Other configurations of an 8-bit by 8-bit multiplier may be designed according to the present invention, such as sue of CHA adders in place of CHAM adders.

Similarly, a 16-bit by 16-bit multiplier may be designed according to the present invention. Such a 16-bit by 16-bit CHA multiplier may require, for example, sixteen 4-bit by 4-bit CHA multipliers on the front end, four 16-bit CHAM adders, two 20-bit CHAM adders, and one 24-bit CHAM adder to form the final 32-bit product. A block diagram of this adder is shown in FIG. 4. The cumulative propagation delay is $T_{delay}$=57, and $N_{gates}$=2,017. A 16-bit by 16-bit systolic array multiplier has $T_{delay}$=94, and $N_{gates}$=1,536. The speed ratio of CHA to systolic is thus 1.65, and the gate count ratio is 1.31.

The algorithm of the present invention may also be used to design a 32-bit by 32-bit multiplier. The 32-bit by 32-bit CHA multiplier may require, for example, sixty-four 4-bit by 4-bit CHA multipliers on the front end, eight 32-bit CHAM adders, four 36-bit CHAM adders, two 40-bit CHAM adders, and one 48-bit CHAM adder to form the final 64-bit product. The cumulative propagation delay is $T_{delay}$=102, and $N_{gates}$=8,312. A 32-bit by 32-bit systolic array multiplier has $T_{delay}$=190, and $N_{gates}$=6,144. The speed ratio of CHA to systolic is thus 1.86, and the gate count ratio is 1.35.

A 64-bit by 64-bit multiplier may be designed according to the present invention. The 64-bit by 64-bit CHA multiplier may require, for example, two hundred and fifty-six 4-bit by 4-bit CHA multipliers on the front end, sixteen 64-bit CHAM adders, eight 68-bit CHAM adders, four 72-bit CHAM adders, two 80-bit CHAM adders, and one 96-bit CHAM adder to form the final 128-bit product. The cumulative propagation delay is $T_{delay}$=195, and $N_{gates}$=33,513. A 64-bit by 64-bit systolic array multiplier has $T_{delay}$=382, and $N_{gates}$=24,576. The speed ratio of CHA to systolic is thus 1.96, and the gate count ratio is 1.36. It is possible to design multipliers of any number of bits according to the present invention.

Figure 15:
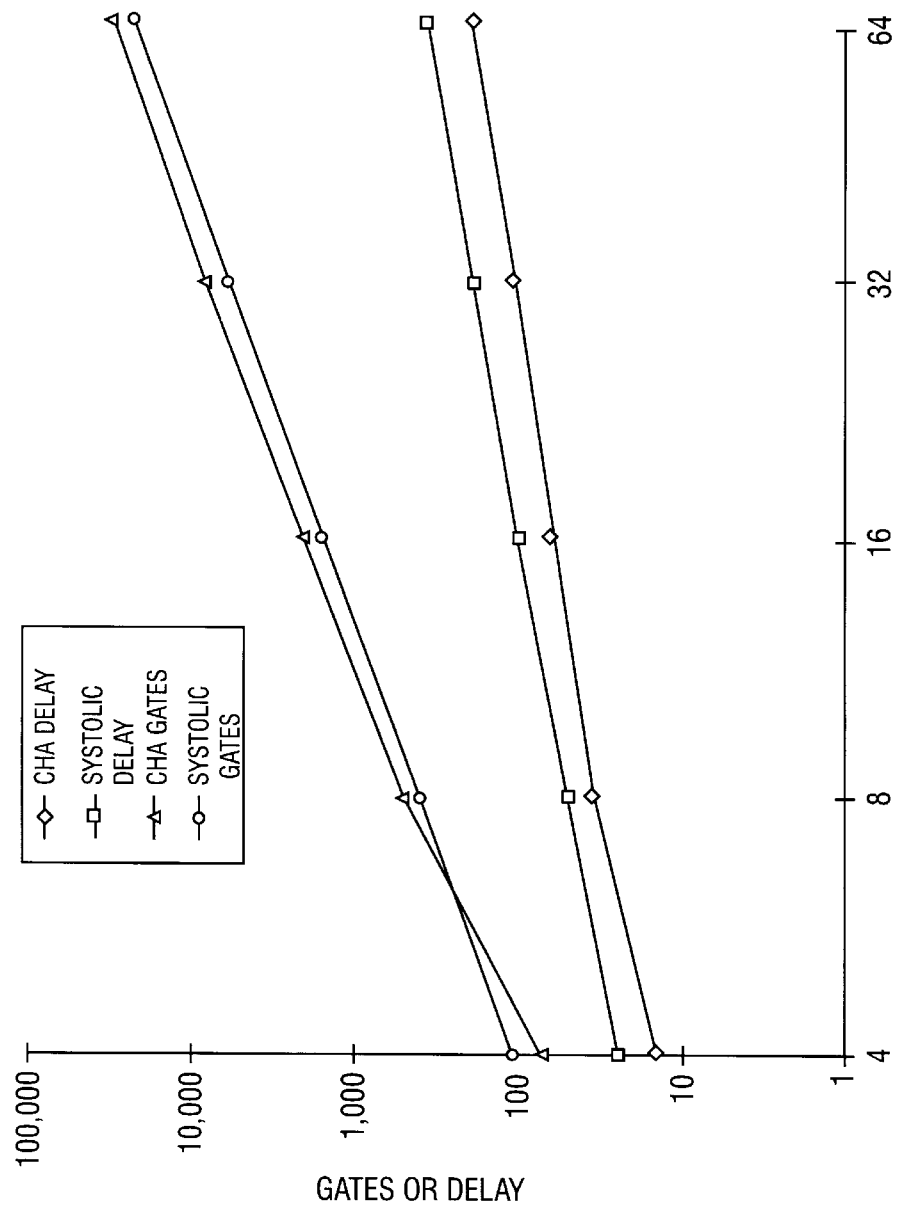
FIG. 15 is a graphical representation of a CHA and systolic multiplier gate delays and gate counts.

FIG. 15 compares the design parameters of the above multipliers to their systolic array equivalents. As seen from the data, the speed ratio for CHA to systolic ranges from 1.69 to 1.96 from 4-bits to 64-bits, while the gate ratio ranges from 0.69 to 1.36 from 4-bits to 64-bits. This data is also shown in FIG. 20.

The present invention may also be used in calculating floating point numbers. Although the cascaded adder architecture allows for the simplified design of n-bit by n-bit integer multipliers, to achieve the speed necessary for a competitive, double-precision, floating point multiplier, the CHA adders may be replaced with an even faster adder design. For example, a carry look ahead adder (CLA) using standard 0.8 micron CMOS geometries may be used. To achieve higher throughput it may be necessary to introduce pipelining.

Figure 16:
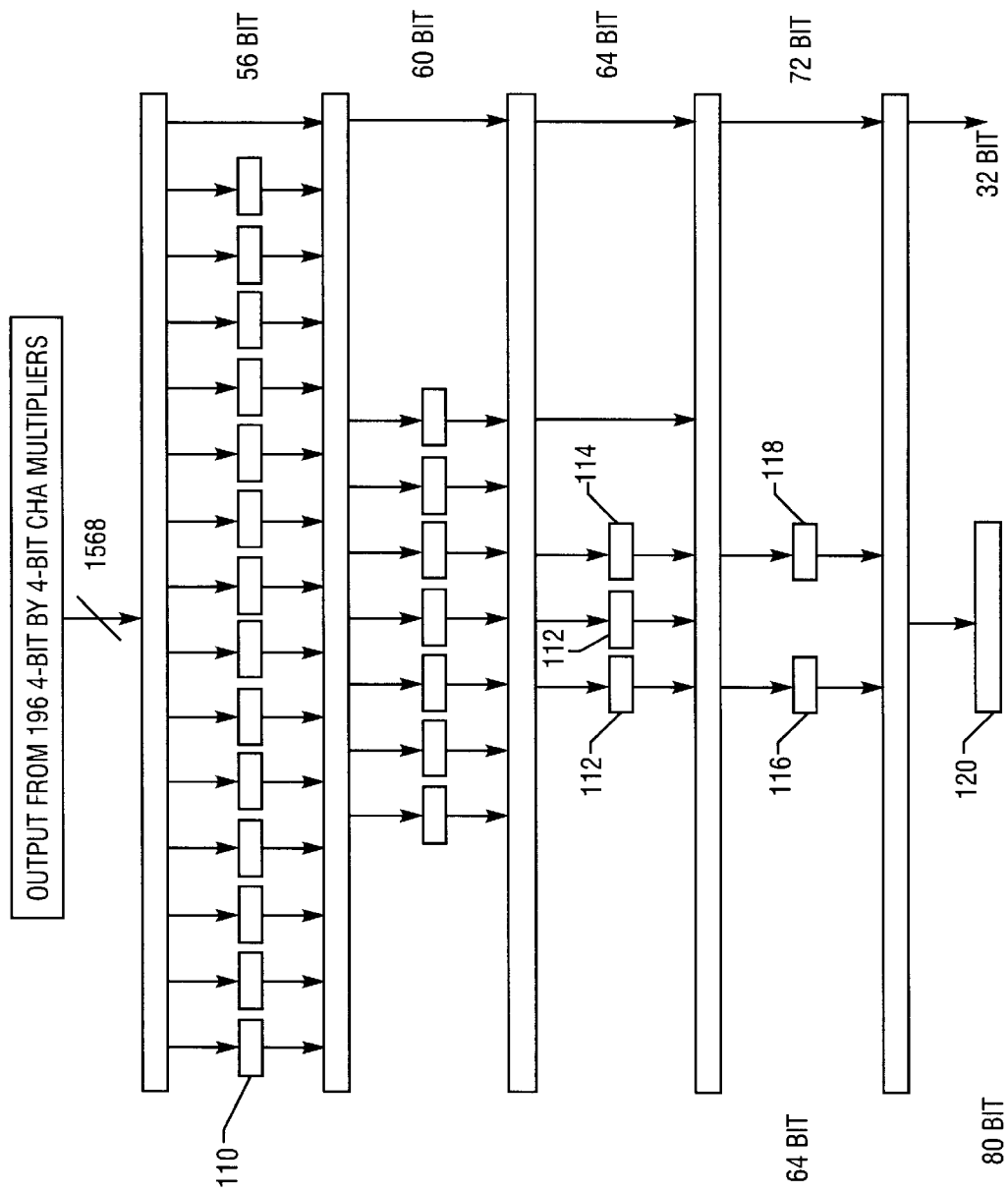
FIG. 16 is a block diagram of a 56-bit by 56-bit mantissa multiplier schematic.

The IEEE Standard 754 for Binary Floating Point Arithmetic specifies a 52-bit fraction, with an implied 1 to the left of the binary point, i.e., I.ffff . . . ffff. Thus, a 53-bit by 53-bit multiplier is required. In this design, there is a granularity of 4 bits; therefore, a 56-bit by 56-bit multiplier may be used. The three least significant bits (LSBs) are set to zero. The most significant bit (MSB) is set to 1. FIG. 16 illustrates a block diagram layout of such a circuit. This design is based on a modified 64-bit by 64-bit architecture, with some required asymmetry.

The design comprises one hundred and ninety-six (196) 4-bit by 4-bit front end CHA multipliers (not shown in FIG. 16). These multipliers may then be fed into a plurality of first level adders 110. These adders 110 may be, for example, fourteen (14) 56-bit CHA adders. The 4 LSB 60-bit sums of the first level may be fed into a plurality of second level adders. These adders may be, for example, two 64-bit CLA adders 112, while two of the three MSB 60-bit sums may be fed into one 64-bit adder 114. The remaining MSB 60-bit sum may be fed to a latch (a delay stage in the pipeline). The LSB sums from the 64-bit adders may be fed into a 72-bit adder 116, while the 64-bit MSB sums may be fed into a 64-bit adder 118. Finally, the MSB and LSB sums may be fed into an 80-bit adder 120, with an offset of 32 bits to form the final 112-bit product.

Each of the CLA adders may based on, for example, standard Mentor Graphics™ CMOS library devices. It may be noted that for this pipelined design, the output from each multiplier and adder stage may be latched using standard CMOS D-flip-flops, to produce six pipeline stages.

It is noted that the various components used in these designs may be taken from the standard Mentor Graphics™ CMOS library for 0.8 micron devices for both "worst case" and "best case" fabrication process parameters. It is to be understood that other libraries and devices may be used to design multipliers and adders according to the present invention.

Figure 17:
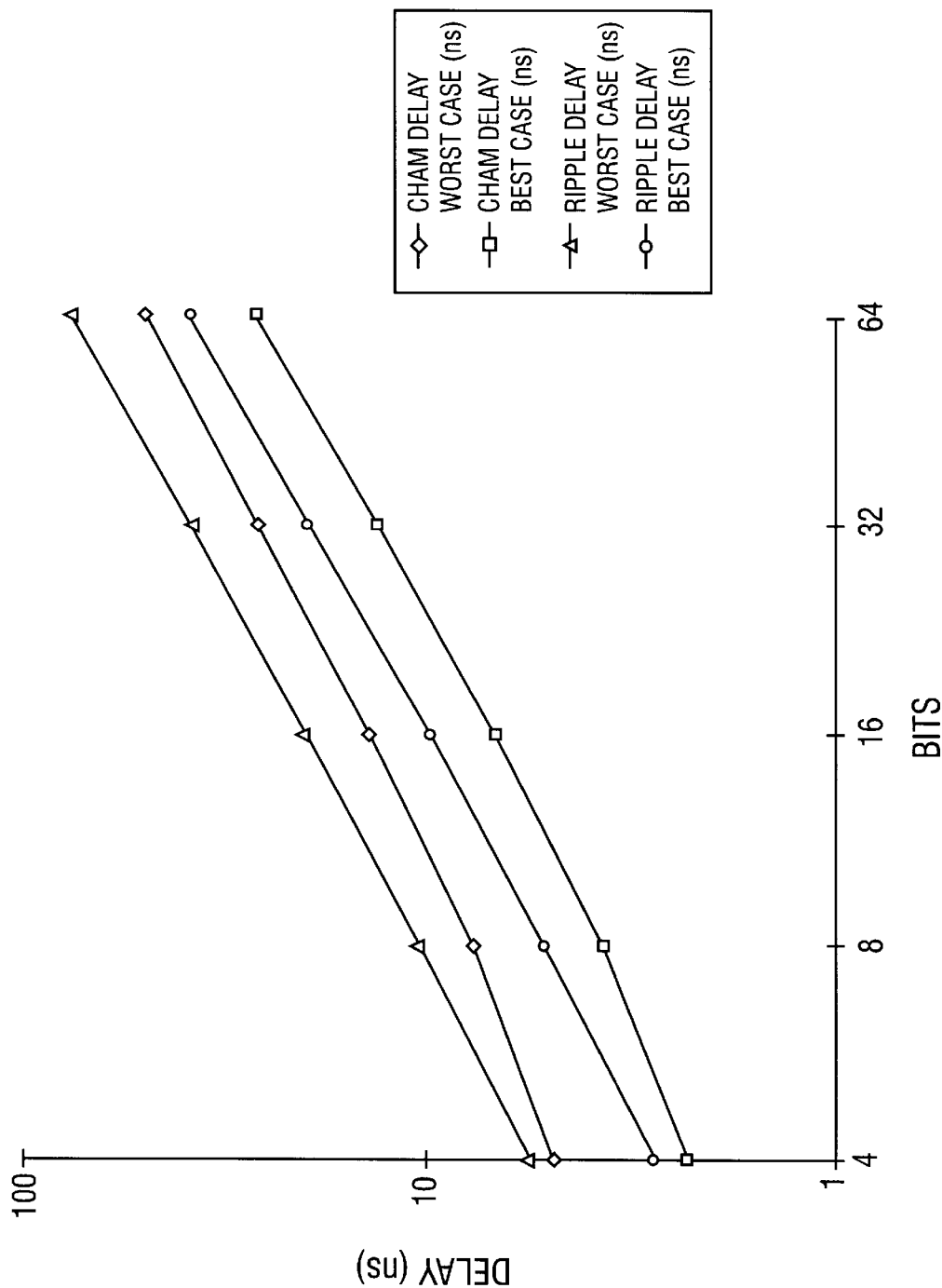
FIG. 17 is a graphical representation of simulation results for CHAM and ripple adders.

Simulation results for n-bit CHA adders with staircase couplers versus ripple adders using the same unit cells are shown in FIG. 21. The linear regression best fit equations are also given. The delay times for the CHA adders using the 0.8$\mu$geometry for "best case" process parameters reveal that the 4-bit CHA adder has an effective delay time of 2.30 nanoseconds, and that an n-bit CHA adder has an effective delay time of [2.15+(n/4−1)*1.56] nanoseconds. The ripple adders using the same geometry and process parameters give a delay of [0.42+0.59n] nanoseconds. In the limit, the speed ratio of CHA to ripple approaches 1.51 for large n. These simulation results are presented in FIG. 17.

Figure 18:
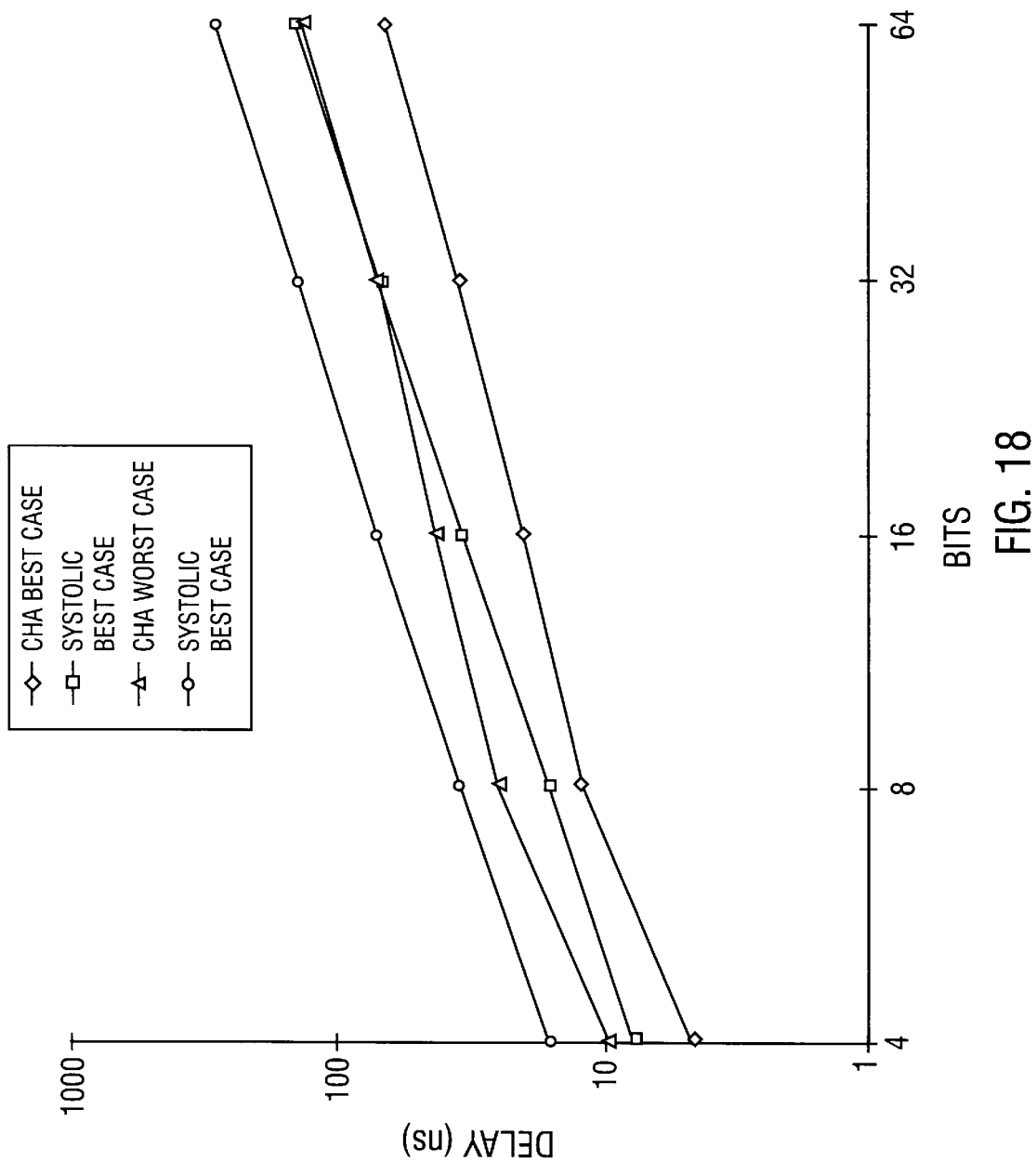
FIG. 18 is a graphical representation of simulation results for CHA and systolic array multipliers.

Results for 4-bit by 4-bit, 8-bit by 8-bit, 16-bit by 16-bit, and 32-bit by 32-bit, as well as extrapolated values for the 64-bit by 64-bit multipliers are shown in FIG. 18. These results are also shown in FIG. 22.

The results for a 0.8$\mu$ geometry "worst case" process show a latency of 80 nanoseconds, and a pipelined rate of one output every 15 nanoseconds. Thus, this multiplier is capable of 66 MHz operation.

CHA based multipliers according to the present invention are a viable and competitive architecture for realizing fast n-bit by n-bit multiplication using standard CMOS geometries and fabrication processes. For example, a simulation of an 8-bit by 8-bit Wallace Tree multiplier, using standard carry propagate adders and carry save adders gave a propagation delay of 24.85 nanoseconds for the 0.8$\mu$ geometry "worst case" process, and 11.35 nanoseconds for the 0.8$\mu$ geometry "best case" process. These values are only 1.09 to 1.2 nanoseconds better than the results for an 8-bit by 8-bit CHA multiplier with similar geometries and process parameters.

Additional optimization of the CHA multipliers may to be feasible because no carries into the higher order bit positions appear to occur past the second addition stage. Although this may not greatly increase the speed of the multipliers, the order of the adders required may be reduced, resulting in an appreciable savings in circuitry size.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An adder circuit for summing two n-bit numbers to develop a final sum, comprising:

a first n/2-bit adder circuit connected to receive n/2 least significant bits of each of said n-bit numbers to develop a first (n/2+1)-bit output;

a second n/2-bit adder circuit connected to receive n/2 most significant bits of each of said n-bit numbers to develop a second (n/2+1)-bit output;

a first half adder circuit receiving a first input from a most significant bit of said first (n/2+1)-bit output, and a second input from a least significant bit of said second (n/2+1)-bit output, a carry output of said first half adder circuit being connected to a first input of a second half adder circuit;

said second half adder circuit receiving a second input from a first more significant bit of said second (n/2+1)-bit output, a carry output of said second half adder circuit being connected to a first input of a third half adder circuit;

said third half adder circuit receiving a second input from a second more significant bit of said second (n/2+1)-bit output, a carry output of said third half adder circuit being connected to a first input of a fourth half adder circuit;

said fourth half adder circuit receiving a second input from a third more significant bit of said second (n/2+1)-bit output, a carry output of said fourth half adder circuit being connected to a first input into a logic gate; and said logic gate receiving a second input from a fourth more significant bit of said second (n/2+1)-bit output.

2. A digital circuit as claimed in claim 1, wherein said first and second n/2 bit adder circuits comprise a plurality of half adder circuits.

3. A digital circuit as claimed in claim 1, wherein a sum output of said first half adder circuit is a (n/2+1)th LSB of said final sum.

4. A digital circuit as claimed in claim 1, wherein a sum output of said second half adder circuit is a (n/2+2)th LSB of said final sum.

5. A digital circuit as claimed in claim 1, wherein a sum output of said third half adder circuit is a (n/2+3)th LSB of said final sum.

6. A digital circuit as claimed in claim 1 wherein a sum output of said fourth half adder circuit is a (n/2+4)th LSB of said final sum.

7. A digital circuit as claimed in claim 1, wherein an output of said logic gate is a (n/2+5)th LSB of said final sum.

8. A digital circuit as claimed in claim 1, wherein said second n/2-bit adder circuit is a CHA adder.

9. A digital circuit as claimed in claim 1, wherein n equal 8.

10. A digital circuit as claimed in claim 1, wherein said logic gate comprises an OR gate.

* * * * *